United States Patent [19]
Genova et al.

[11] Patent Number: 6,032,527
[45] Date of Patent: Mar. 7, 2000

[54] SOLID STATE MICROANEMOMETER

[75] Inventors: Perry A. Genova, Chapel Hill; Timothy W. Tsuei, Durham, both of N.C.

[73] Assignee: Memsys, Inc., Raleigh, N.C.

[21] Appl. No.: 09/108,894

[22] Filed: Jul. 1, 1998

[51] Int. Cl.[7] .................................................. G01F 1/68
[52] U.S. Cl. ................................. 73/204.26; 73/204.25
[58] Field of Search .......................... 73/204.26, 204.25, 73/170.12, 861.85

[56] References Cited

U.S. PATENT DOCUMENTS

| | | | |
|---|---|---|---|
| 4,343,768 | 8/1982 | Kimura | 73/204.26 |
| 4,624,138 | 11/1986 | Ono et al. | 73/204.26 |
| 4,825,693 | 5/1989 | Bohrer et al. | 73/204.25 |
| 4,888,988 | 12/1989 | Lee et al. | 73/204.26 |
| 4,947,688 | 8/1990 | Yagawara et al. | 73/204.26 |
| 5,108,193 | 4/1992 | Furubayashi | 73/204.26 |
| 5,291,781 | 3/1994 | Majata et al. | 73/204.26 |
| 5,310,449 | 5/1994 | Henderson | 73/204.26 |
| 5,311,775 | 5/1994 | Suski et al. | 73/204.26 |
| 5,353,638 | 10/1994 | Marek | 73/204.26 |
| 5,622,586 | 4/1997 | Vaitkus et al. | 73/204.26 |
| 5,703,287 | 12/1997 | Treutler et al. | 73/204.26 |
| 5,705,745 | 1/1998 | Treutler et al. | 73/204.26 |

*Primary Examiner*—William Oen
*Attorney, Agent, or Firm*—Kane, Dalsimer, Sullivan and Levy, LLP

[57] ABSTRACT

A solid state microanemometer is micromachined from a bonded silicon wafer comprising two silicon layers. The microanemometer comprises a first semiconductor wafer doped with an impurity having an upper planar surface and a lower planar surface with a peripheral edge; and a second semiconductor wafer bonded to the first semiconductor wafer having an upper planar surface; a lower surface; and a cavity having a peripheral edge and a peripheral margin defined on the upper planar surface and bounded by the peripheral edge of the cavity wherein the lower planar surface of the first semiconductor is bonded to the peripheral margin of the cavity so as to at least partially close the cavity wherein 0.025 to 99% of the peripheral edge of the lower planar surface of the first semiconductor overlaps with the peripheral edge of the cavity.

26 Claims, 5 Drawing Sheets

SOLID STATE MICROANEMOMETER

BACKGROUND OF THE INVENTION

1. Field of the Invention

This invention relates to a solid state microanemometer with improved structural integrity, sensing capability and versatility in application.

2. Brief Description of Related Art

A microanemometer is a device which measures the velocity and direction of fluid flow. This device is readily adaptable for use in a wide variety of applications. For instance, an array of these devices may be connected to associated computer interfaces to provide "intelligent" sensing of microflow patterns for medical, industrial or other applications.

Henderson, U.S. Pat. No. 4,930,347 discloses a solid state microanemometer micromachined out of a single deep level doped semiconductor crystal and includes four corner supports interconnected to four spanning members which form the resistor legs of a Wheatstone bridge. This device relies upon substantial thermal and electrical isolation of the resistor legs to provide high temperature sensitivity and fast response time.

For many applications, it is necessary for a microanemometer to withstand varying degrees of mechanical vibration over a long period of time. Otherwise, frequent breakage would necessitate excessive material and labor costs associated with replacement. Especially in sensing liquid flow, solid state microanemometers seem to be particularly susceptible to conditions of mechanical or physical wear.

Therefore, the success of a solid state microanemometer depends not only upon its high temperature sensitivity and fast response time, but also upon its ability to maintain these qualities under conditions of mechanical stress over a period of time.

It is also known that raising the operating temperature of a microanemometer increases its sensing capability. For a microanemometer of the type shown in U.S. Pat. No. 4,930,347, which utilizes self-heating resistors, this would suggest operation of the device at a higher current to increase the operating temperature of the resistors. However, because the self-heating resistors are interconnected by silicon, which has a high thermal conductivity, an increased current magnifies thermal shorting between the resistors, and thereby diminishes the capability of the device to detect small temperature differences. This capability may be for necessary for accurate sensing of fluid flow direction.

Henderson, U.S. Pat. No. 5,231,877 discloses a solid state microanemometer which is micromachined from a crystal to a shape with four thick external sides that define an outer rectangle, four thin sections that define an inner rectangle and four diagonally directed branches interconnecting the corners of the outer rectangle to the inner rectangle. Four semiconductor resistors located on the four inner sections form a sensing bridge. Each external side has a pair of electrical contacts that are electrically interconnected, via conductive leads that extend along the diagonal branches and partially along the inner sections, to one of the semiconductor resistors.

The '877 Henderson patent is an improvement over the '347 Henderson patent, as the thermal and electrical isolation of the resistors from each other permits higher operating temperatures and improved fluid flow sensing capability. However, the thin nitride bridging used to suspend the device has a tendency to break off when used in systems under mechanical stress.

Therefore there is a need for a microanemometer with a high temperature sensitivity that can be maintained under conditions of mechanical stress over a period of time.

SUMMARY OF THE INVENTION

It is thus an object of this invention to provide a highly sensitive solid state microanemometer with the structural integrity necessary to withstand mechanical vibration.

It is another object of the invention to provide an improved solid state microanemometer with optimal temperature sensitivity by raising the sensor element up into the flowstream, enabling more accurate measurements, It is another object of the invention to provide an improved solid state microanemometer with improved structural rigidity and versatility in application by providing a means of thermally isolating the thermal element from the bulk silicon and allowing for design tradeoffs between thermal isolation and strength.

It is still another object of the invention to provide a solid state microanemometer capable of withstanding mechanical stresses associated with liquid flow by providing strength advantages over suspended mass approaches.

Other objects of the invention will be appreciated by those skilled in the art after reading the whole of the specifications and the claims. The foregoing objects and others which will become apparent from that which follows may be achieved by the inventive microanemometer which comprises:

a) an electrically conductive resistor means comprising a first semiconductor wafer doped with an impurity having
  1) an upper substantially planar surface;
  2) a lower substantially planar surface having a peripheral edge;

b) a second semiconductor wafer bonded to the first semiconductor wafer having
  1) an upper substantially planar surface;
  2) a lower surface;
  3) a cavity having a peripheral edge and a peripheral margin defined on the upper planar surface and bounded by the peripheral edge of the cavity wherein the lower planar surface of the first semiconductor is bonded to the peripheral margin of the cavity so as to at least partially close the cavity wherein 0.025 to 99% of peripheral edge of the lower planar surface of the first semiconductor overlaps with the peripheral edge of the cavity; and c) a means for electrically connecting the resistor means to a current source.

This structure combines structural rigidity with optimum sensing capability and versatility in application. This new design has a more stable structure as the sensor is supported by the periphery of the upper surface of the second semiconductor rather than being suspended from nitride or other oxide bridging like prior art sensors. Additionally, the sensor is raised into the flow path to increase sensitivity by being directly exposed to the flow path.

The flow sensor is placed in the path of flow and can be powered with a constant current. The sensor element heats up to a fixed temperature, resistance and measured voltage drop. This voltage drop across the resistor is used as the baseline for measurements. In constant current mode, when the ambient flow cools the element, a greater voltage is applied causing a corresponding change in resistance and voltage. The change in voltage is directly proportional to the rate of flow over the sensor. In a preferred mode of operation, the flow sensor is operated in constant temperature mode where the control circuitry is used to maintain the sensor at a fixed temperature. In constant temperature mode, when the ambient flow cools the elements, a greater voltage is applied which increases the current to maintain the temperature. This method of operation increases sensitivity at higher flows without compromising the life span of the sensor. At low flow rates the sensor may be powered with low current to maintain sensitivity. The advantages to this mode of operation are discussed in detail below.

The microanemometer is preferably micromachined from a silicon wafer comprising two silicon layers bonded together. The top silicon layer is doped, preferably with a n+ deep level impurity to create a sensing element which is a 20 micron sensor mesa (raised) structure. The resistance of the sensor is exponentially dependent on temperature. The sensor is backed by an etched cavity slightly smaller than the peripheral edge of the sensor. The degree of overlap depends on the intended use of the sensor. The greater the degree of mechanical vibration, pressure differential or direct pressure on the sensor element, the more overlap would be preferred to better withstand mechanical stresses.

These and other features of the invention will be more readily understood in view of the following detailed description and the drawings.

BRIEF DESCRIPTION OF THE DRAWINGS

FIG. 3 is a partial cross-sectional view comparing two preferred embodiments the solid state microanemometer shown in FIG. 1

DETAILED DESCRIPTION OF THE INVENTION

Those skilled in the art will gain an appreciation of the invention from a reading of the following description of preferred embodiments, when viewed with the accompanying drawings of FIGS. 1–7 which show an improved solid state microanemometer 10 in accordance with preferred embodiments of the invention.

Figure 1:
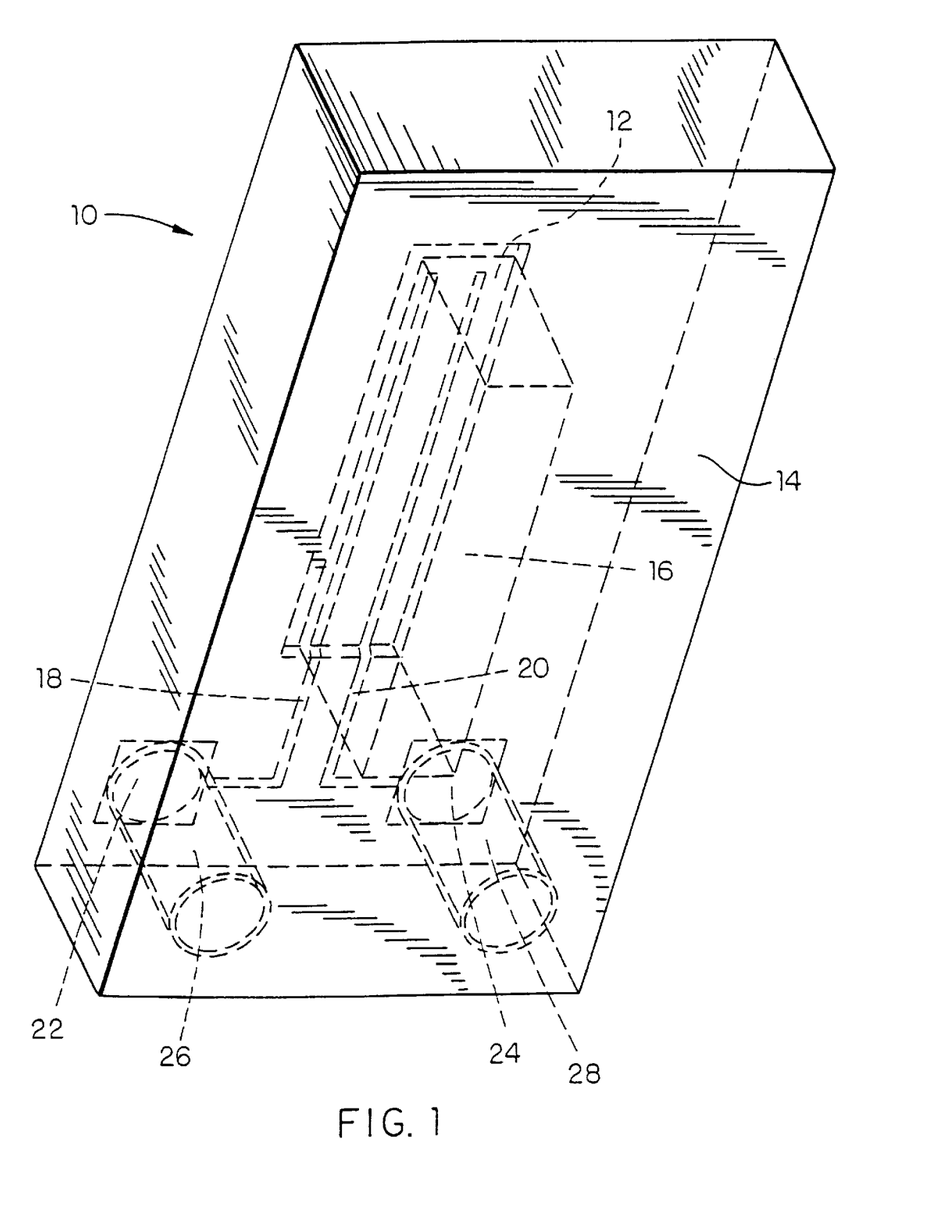
FIG. 1 is a top perspective view of a solid state microanemometer in accordance with a preferred embodiment of the invention.
Figures 2, 3A, 3B:
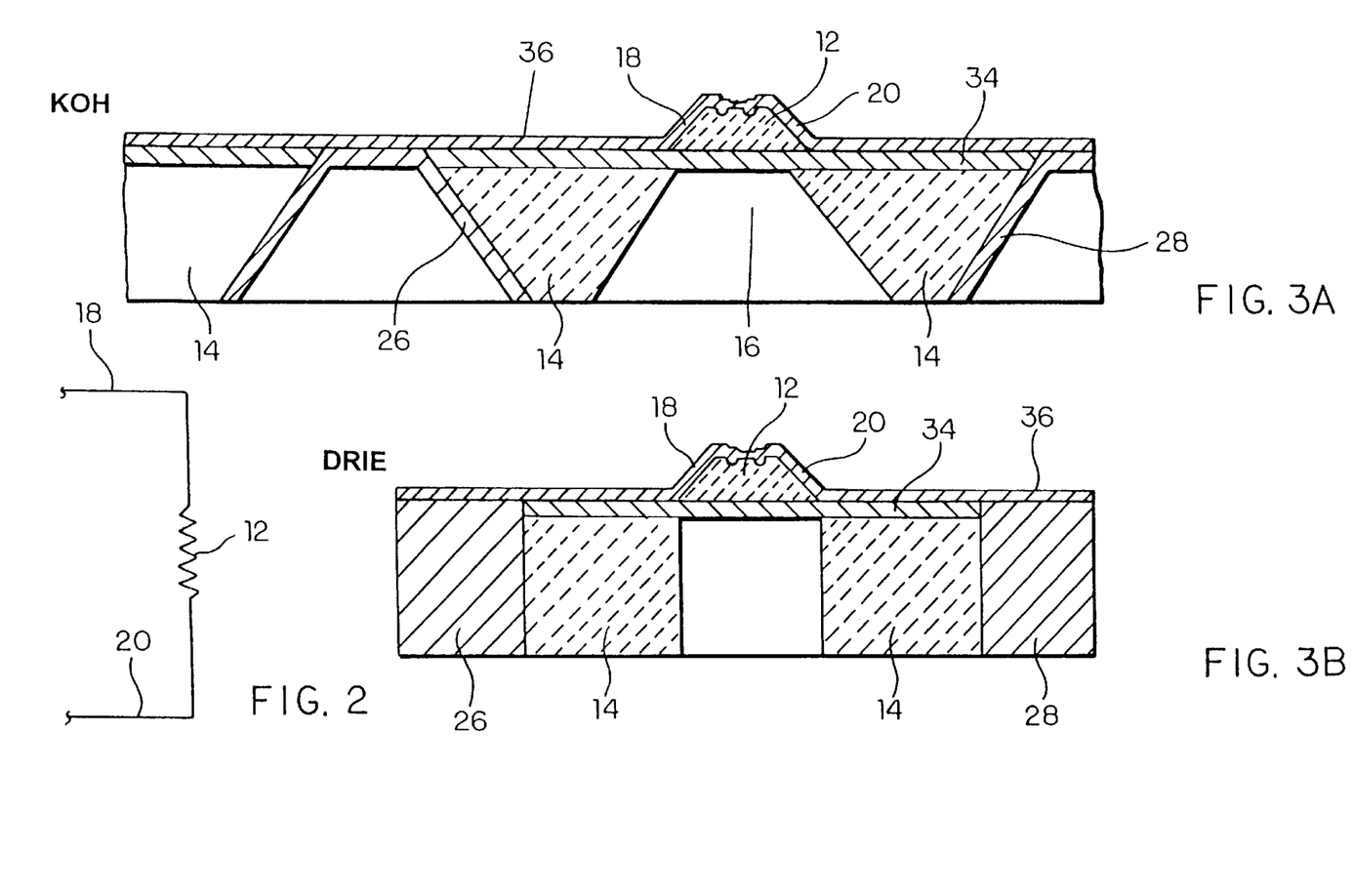
FIG. 2 is a circuit diagram of the solid state microanemometer in accordance with a preferred embodiment of the invention shown in FIG. 1.

Referring to FIG. 1, microanemometer 10 is preferably micromachined from a silicon wafer comprising a sensor 12 where its lower surface is bonded to the upper surface of another silicon wafer which serves as the base wafer 14.

In order to form microanemometer 10 in accordance with a preferred embodiment of the invention, a number of micromachining processing steps may be performed upon sensor 12 and base wafer 14. These steps may include sequenced etching of selected parts of sensor 12 and base wafer 14 to achieve the desired topography. While the sequence of steps is explained with respect to a single crystal, these solid state devices are preferably processed in batches for greater efficiency. Moreover, the particular sequence of steps used to manufacture microanemometer 10 is not considered to be as important as the resulting structure. It is the structural configuration which primarily produces the improved features of microanemometer 10.

In a preferred embodiment, sensor 12 is a structure which is made of silicon that has initially undergone doping with a deep level impurity, i.e., boron, phosphorous or gold, to provide increased sensitivity due to an exponential relationship between free carrier concentration and temperature. The concentration of this deep level doping is about $10^{15}$ atoms/cm$^3$ and can be accomplished through an "open tube" process, as described in U.S. Pat. No. 4,930,347, incorporated herein by reference thereto or other conventional methods. Sensor 12 is also preferably counterdoped by conventional methods such as those described U.S. Pat. No. 5,231,877, incorporated herein by reference thereto.

Sensor 12 preferably has a height of about 10 to about 50 microns and lateral dimensions of about 1.4 mm by about 0.8 mm. In a more preferred embodiment, sensor 12 has a height of about 20 microns. The lower surface of sensor 12 is preferably bonded to the upper surface of base wafer 14 which comprises etched cavity 16 to provide thermal isolation. Base wafer 14 has a preferred thickness of about 250–400 microns. Cavity 16 is smaller than the peripheral edge of sensor 12 whereby 0.025 to 99% of the peripheral edge of sensor 12 overlaps the peripheral edge of base wafer 14. This overlap between the lower surface of sensor 12 and the upper surface of base wafer 14 is necessary because without the peripheral support of the silicon substrate, the structural integrity of microanemometer 10 would be compromised.

The preferred range of overlap would be dependant on the application being used. The overlap between sensor 12 and base wafer 14 represents a thermal loss pathway. For some applications such as measuring rapid air flow in a system, it is more important that thermal sensitivity be compromised for stability while the converse is true in applications where thermal sensitivity is a priority such as measurement of blood flow. Inventive microanemometer 10 has improved stability in comparison with the prior art structures as sensor 12 is now supported by a planar structure rather than being suspended from thin nitride or other (oxide) bridging. Furthermore, sensor 12 is now raised so that it is exposed into the flow path thereby increasing its sensitivity as opposed to prior art sensors which were only partially positioned in the path of flow.

In a preferred embodiment, on the upper surface of sensor 12 and the exposed upper surface of base wafer 14, a metallization layer of Ti/Cu/Ti is preferably deposited and patterned to form conductor lines 18 and 20 over the upper surface of sensor 12. Sensor 12 forms the resistor element between conductor lines 18 and 20. See FIG. 1a. In a preferred embodiment, conductor lines 18 and 20 run off sensor 12 and terminate in corresponding conductor pads 22 and 24 located on the upper surface of base wafer 14 to provide electrical connections. Conductor pads 22 and 24 are deposited on a buried oxide layer which is exposed during the sensor formation process.

Figure 4:
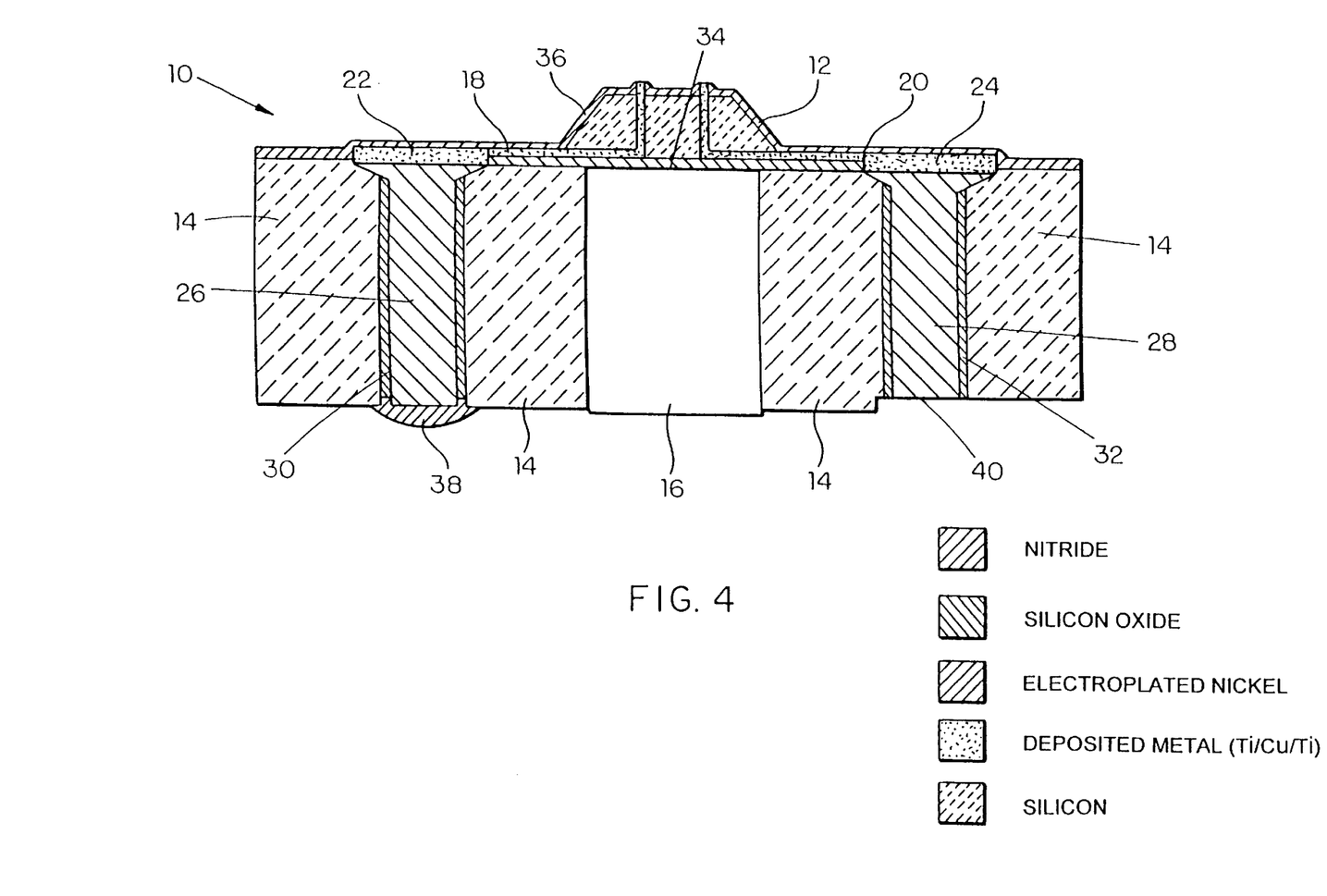
FIG. 4 is a partial cross-sectional view of a preferred embodiment of the solid state microanemometer shown in FIG. 1

FIG. 4 shows a cross sectional view of a preferred embodiment of invention. In a preferred embodiment, the microanemometer 10 further comprises a buried oxide layer 34 which is grown on the upper surface of base wafer 14 to bond sensor 12 and base wafer 14 together. Buried oxide layer 34 preferably has a nominal thickness of about 1 micron.

Backside connection to the microanemometer 10 device is very desirable to improve the sensitivity and unimpeded operation of the sensing element. In a preferred embodiment, pads 22 and 24 may be backed by through-wafer vias (holes) 26 and 28 to provide backside connections. More particularly, through-wafer vias 26 and 28 are preferably 'filled' with any number of conductive materials including adhesives. In such preferred embodiments, vias 26 and 28 reduce the gap between the transducer and the environment being measured; aid in separating electrical connections from liquid environment and enable short length, high-density interconnections.

Through-wafer vias 26 and 28 as well as cavity 16 are preferably formed by any number of etching techniques. For example, wet etching or DRIE (Deep [plasma] Reactive Ionic Etching) or dry etching may used. FIG. 3 shows a comparison of two types of etching, wet etching using KOH and DRIE.

Anisotropic etching using a wet KOH (potassium hydroxide) process is a commonly used technique of micromachining. The scientific principles behind this technique may be found in *Microelectronic Processing*, by W. Scot Ruska. Wet etching requires limited skill and allows processing in large batches. The technique is dependent on crystallographic orientation and therefore always creates angular surfaces at a 54.7 degree angle with the wafer surface as it etches into the wafer. Thus, a square hole on the wafer frontside that is 50 microns on a side will have a larger opening on the backside that is 600 microns on a side for a wafer with a thickness of 400 microns. Significant silicon volume is removed and the overall device is sometimes weakened mechanically. The KOH process is also less precise than other methods of bulk silicon micromachining. Lateral dimensions are highly dependent on wafer thickness, etch duration and pattern alignment.

To achieve single micron lateral precision, DRIE is preferred as a micromachining technique. DRIE uses safe and inert gases. DRIE also requires less substrate area than KOH and allows accurate control of sensor/cavity overhang because any shape can be etched. This provides for flexibility in defining cavity profile and surface contact area of the sensor/cavity overhang. Furthermore, the downward etch rate is much larger than the lateral etch rate to minimize undercutting. When profile anisotropy is required which is independent of crystal structure, DRIE may be advantageous. Because DRIE uses specialized equipment, it is more expensive than wet etching.

Anisotropy in DRIE essentially results from either one of two of the following mechanisms: (1) reduction in reaction probability at the sidewall below a critical value to reduce the spontaneous lateral etching rate to zero; or (2) sidewall passivation based on protection from radical, atomic, and neutral etching species, with or without the addition of a polymerizing chemistry. Several approaches can be used to inhibit lateral etching during the process to maximize anisotropy such as the application of HBr, $Cl_2/SiCl_4$; $SF_6/O_2$ and other oxide layers. The fundamentals of DRIE can be found for example in papers such as *Fabrication Technology for Wafer Through-Hole Interconnections and Three-Dimensional Stacks of Chips and Wafers,* Linder et al; *Dry Silicon Etching for MEMS,* Bharadwaj et al.; *Micromachining an Microfabrication Process Technology,* Bharadwaj et al.

A combination of both wet and dry etching may also be used. For example, wet etching may be used to etch cavities for membrane definition while DRIE may be used for critical crystal orientation independent etch steps.

In a preferred embodiment, through wafer vias 26 and 28 have diameters ranging from 100–250 microns. DRIE is used to etch completely through the base wafer 14, stopping at buried oxide layer 34. Through wafer vias 26 and 28 are surrounded by sidewall oxide layers 30 and 32. The sidewalls 30 and 32 of the holes and the remainder of the backside are oxidized for electrical passivation with a nominal oxide layer thickness of 2000 angstroms. Vias 26 and 28 may be electroplated fully or just on the inner surface of the etched hole, creating electrical contact to the frontside of the wafer.

In a preferred embodiment, plating from the frontside to the back to fill the etched holes is preceded by an etch step to remove the buried oxide layer 34 from the frontside metal pads 22 and 24. Metal pads 22 and 24 serve as the plating base for the electroplating process.

Further etching is performed to remove the buried oxide layer 34 and some of the sidewall oxides 30 and 32. The etching is done in such a manner so as to leave oxide layers 30 and 32 along the sidewalls intact. If layers 30 and 32 are compromised, electrical connections between vias 26 and 28 (after electroplating) may create a short circuit.

Electroplating can create protrusions of overplated metal 38 from the backside surface. To create a planar surface 40, the protrusions of overplated metal 38 may be removed from the backside using physical processes such as planarization, lapping, or polishing. In a first preferred embodiment, the overplated metal is preferably removed down to the level of the silicon substrate which also removes a thin photoresist layer (not shown in the drawing), approximately 1 to 20 microns.

In a second preferred embodiment, the overplated metal is not removed to the level of the silicon. Rather, a thicker photoresist layer, preferably over 20 microns thick, is removed, resulting in well-defined planarized protrusions 38 of metal approximately the thickness of the photoresist layer. As the dimensions of the photoresist layer are controllable, so the dimensions of protrusions 38 themselves are controllable. In practice, the protrusions may advantageously be used for facilitating connections to a board, glass, chip or some other substrate. This embodiment has the advantage of using its removal step to create protrusions for connections instead of merely removing the metal to planarize the surface. Therefore, with this embodiment, instead of bonding wires to the bottom of the sensor, a conductive adhesive may be applied to the protrusions to connect the chip to a another substrate. Therefore there is further flexibility in mounting and packaging while removing a post-fabrication step.

As a final step, the entire outer surface of the microanemometer 10 is passivated by depositing doped silicon dioxide, chemical evaporation of silicon nitride, deposition of polyimide or a variety of appropriate coatings. A nitride passivation layer 36 is shown over the entire frontside structure (upper surface of sensor 12 and the exposed upper surface of base wafer 14). The purpose of the frontside passivation layer is not only for electrical isolation but also for protection from mechanical and chemical damage in subsequent processing. A coating with high thermal conductivity is desirable. The layer is deposited by chemical vapor deposition at a temperature low enough not to harm the metallization. The thickness of the passivation layer is not overly critical, but is typically 0.5 to 1.5 microns to prevent significant thermal overload. The film chemistry should be controlled to prevent future corrosion and thus the film should be non porous and free from excessive stresses.

Figure 5:
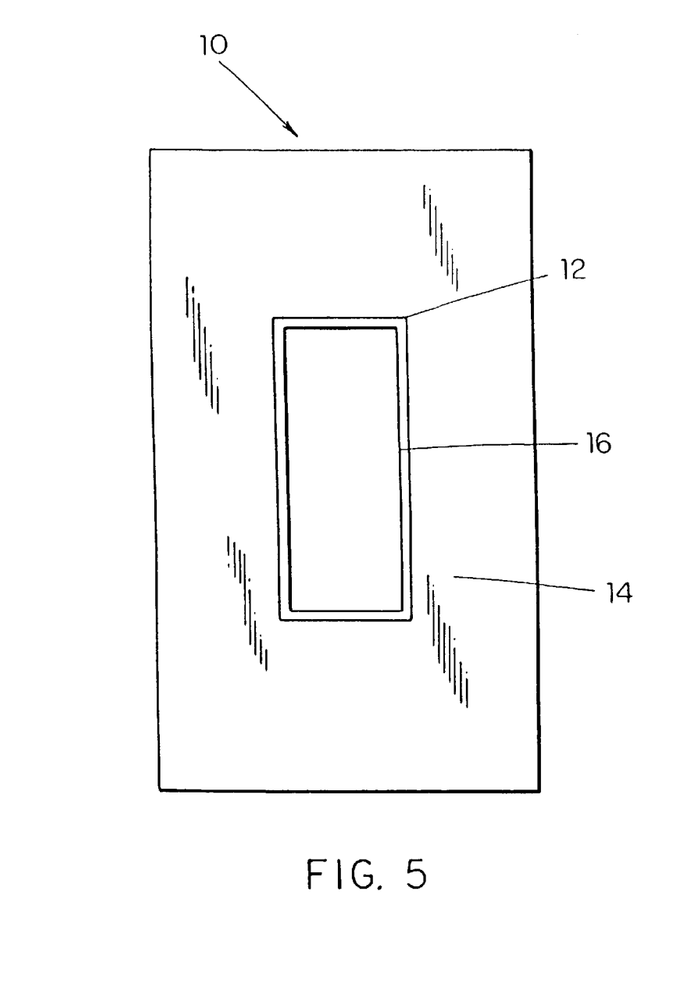
FIG. 5 and FIG. 6 are backside views comparing two preferred embodiments of this invention.
Figure 6:
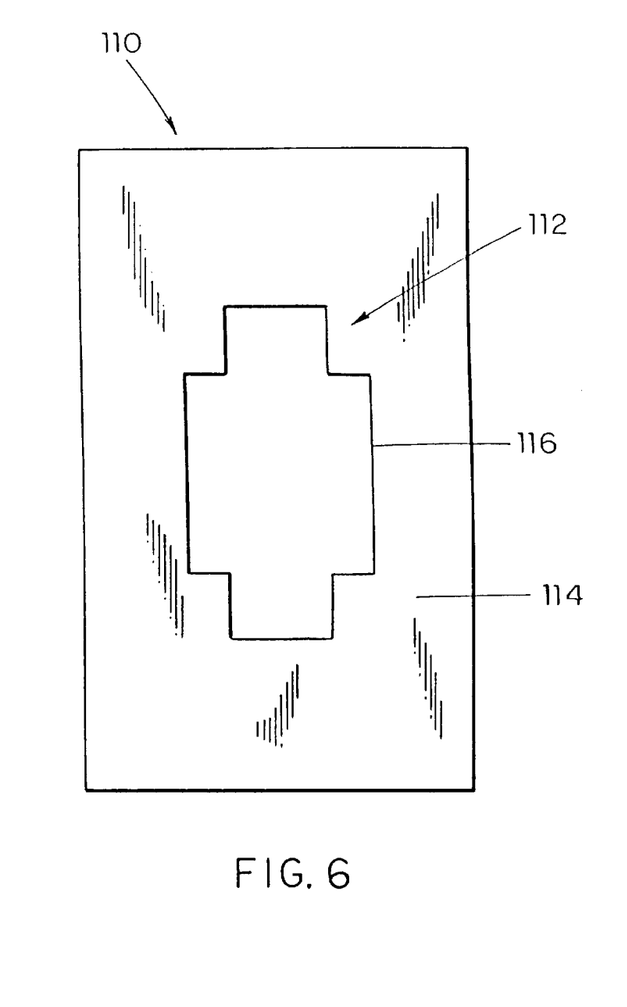

The area of sensor 12 that is supported on base wafer 14 is a thermal loss pathway. The primary purpose for the overlap is to provide support for sensor 12. As shown in FIGS. 5 and 6, the flow sensor cavity 16 can be modified so that there is less overlap between the substrate wafer 14 and sensor 12. This preferred embodiment of the design enhances thermal sensitivity. Microanemometer 110 includes sensor 112 which is supported by isolation cavity 116. Instead of a rectangular shape when viewed from above, isolation cavity 116 includes protruding areas on each side of the cavity. Sensor 112 remains supported by the four corners of cavity 116 while the overlapping area has been significantly reduced, thereby increasing thermal isolation. This sensor variant represents a compromise between thermal response and structural integrity.

Figure 7:
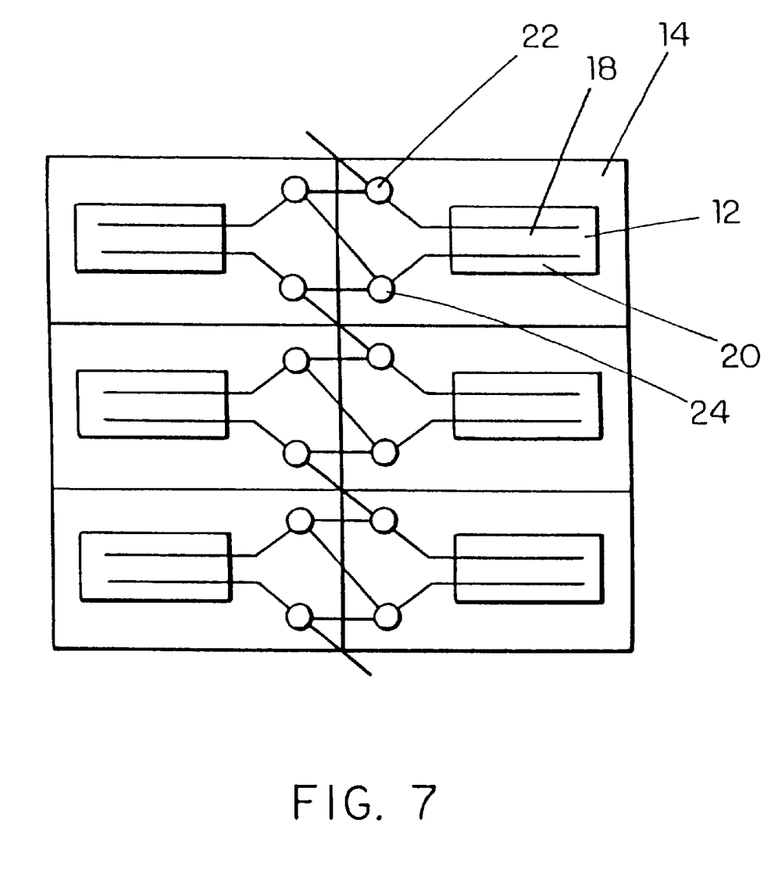
FIG. 7 is a top view of another preferred embodiment of the invention.

Each microanemometer 10 is connected to a pair of conductive leads and a pair of contacts. As shown in FIG. 7, a common plating ground may be used for efficiency in electroplating. However, since the size of the holes tends to vary in different regions, some areas will plate faster than others. Therefore, two methods were discovered and developed to plate different sections on a single plate. The first is to maintain a constant current and disconnect areas as they are completed. The electrical continuity between vias is easily severed during dicing and packaging process. Another alternative is to vary current densities to each area relative to the plating patterns so that the holes fill up at once. This second method requires the creation of several common plating grounds, one for each area on the wafer that is to be plated.

INDUSTRIAL/COMMERCIAL APPLICATION

The final solid state microanemometer 10 provides optimum sensing capability in all modes of resistance fluid flow detection. Due to its extremely small size and versatility in application, a large number of these solid state microanemometers 10 may be located in a relatively small area in separate groups or arrays, with the devices operating independently to sense flow in each of the various flow sensing modes. Microanemometer 10 may be viewed as a generic flow sensor adapted for operation in any selected sensing mode. In practice, the flow sensor is placed in the path of flow and may be powered with a constant current. A typical current might be 15 mA DC. In a preferred embodiment, the sensor is operated in constant temperature mode where control circuitry is used to maintain the sensor at a fixed temperature. In this embodiment, the ambient flow cools the elements, a greater voltage is applied which increases the current to maintain the temperature as $V(T_{ref})=V_{meas}-[(T-T_{ref})dV/dT)]$ where V is voltage and T is temperature. There are advantages to operating the microanemometer at a constant operational temperature and thereby at a constant hot resistance, since the thermal inertia of the sensor element is automatically adjusted when flow conditions vary. This mode of operation is achieved by incorporating a feedback differential amplifier into the control circuitry to obtain a rapid variation in the heating current to compensate for instantaneous changes in the flow velocity. Constant temperature circuits respond faster to changes in flow than sensors operated in constant current. Furthermore, the life span of the sensor can be extended by minimizing incidents of over powered sensors in low or no flow conditions in constant current mode. Microanemometer 10 may be designed specifically for measuring airflow in medical instrumentation and as such, devices using microanemometer 10 may be optimized for low flow rates of approximately 12 fps and below.

One of the various target applications for microanemometer 10 is handheld spirometry. Spirometers are used to acquire pulmonary waveforms. These data can be used to predict the onset of respiratory distress in asthmatics, or to measure the efficacy of a drug. Current devices utilize a pressure differential approach to spirometry which is not sensitive to low flow. The higher flow rates indicative of the early inhalation or exhalation waveform are easily measured but the lower flow rates at the beginning and end of the waveforms are not. Microanemometer 10 is much more sensitive due to its small size, lower thermal mass, and faster response.

Microanemometer 10 is also suitable for a variety of liquid applications. Advantages over current flow sensors like small size, quicker response and lower cost of fabrication hold true in this environment as well. Implementation in infusion pumps for medical applications, soft drink dispensers, water and gas meters are possible.

Additionally, modifications may be made in the fabrication and assembly processes to facilitate the use of microanemometer 10 in high flow liquid environments. The practicalities of micromachining and electrical connectability to other external devices dictate the lower size limit of this microanemometer 10, while considerations such as response time, space availability and the application may dictate upper size limits.

While some preferred embodiments of the invention and a suggested method for manufacturing the invention have been described, applicant does not wish to be limited thereby, and it is to be understood that various modifications could be made without departing from the scope and spirit of the invention. For instance, other micromachined topographical shapes would also be acceptable so long as structural integrity was maintained, while balancing thermal and electrical isolation from the rest of the original crystal. Accordingly, it is to be understood that changes may be made without departing from the scope of the invention as particularly set out and claimed. Those changes would be apparent to those skilled in the art.

We claim:

1. A microanemometer comprising:
   a) an electrically conductive resistor in the form of a first semiconductor wafer doped with an impurity having
      1) an upper substantially planar surface;
      2) a lower substantially planar surface having a peripheral edge;
   b) a second semiconductor wafer bonded to the first semiconductor wafer having
      1) an upper substantially planar surface;
      2) a lower surface;
      3) a cavity having a peripheral edge and a peripheral margin defined on the upper planar surface and bounded by the peripheral edge of the cavity wherein the lower planar surface of the first semiconductor is bonded to the peripheral margin of the cavity so as to at least partially close the cavity wherein 0.025 to 99% of peripheral edge of the lower planar surface of the first semiconductor overlaps with the peripheral edge of the cavity; and
   c) a means for electrically connecting the resistor to a current source.

2. A microanemometer according to claim 1 wherein the upper planar surface of the first semiconductor is smaller than the lower planar surface of the first semiconductor.

3. A microanemometer according to claim 1 further comprising an oxide layer wherein the lower planar surface of the first semiconductor is bonded to the peripheral margin of the cavity by an oxide layer residing between the lower planar surface of the first semiconductor and the peripheral margin.

4. A microanemometer according to claim 3 wherein the oxide layer has a thickness of about 1 micron.

5. A microanemometer according to claim 3 wherein the oxide layer comprises Silicon oxide.

6. A microanemometer according to claim 1 wherein the first semiconductor has height of about 10 to 50 microns.

7. A microanemometer according to claim 1 wherein the first semiconductor has height of about 20 microns.

8. A microanemometer according to claim 1 wherein the first semiconductor has lateral dimensions of about 1.4 mm by about 0.8 mm.

9. A microanemometer according to claim 1 wherein the second semiconductor has height of about 250 to 400 microns.

10. A microanemometer according to claim 9 wherein the second semiconductor has height of about 300 microns.

11. A microanemometer according to claim 1 wherein the first semiconductor comprises silicon doped with a n+ deep level impurity.

12. A microanemometer according to claim 1 wherein the means for electrically connecting the resistor to a current source comprises two metal lines connected to the upper surface of the first semiconductor.

13. A microanemometer according to claim 12 further comprising two pads wherein the two pads are connected respectively to the two metal lines.

14. A microanemometer according to claim 13 further comprising two through-wafer holes wherein the two pads are respectively backed by the through-wafer holes filled with electroplated metal.

15. A microanemometer according to claim 14 wherein the electroplated metal filling the through-wafer holes protrude from their respective through-wafer holes at least 20 microns.

16. A microanemometer according to claim 14 wherein a sidewall oxide layer coats the interior of each of the through-wafer holes.

17. A microanemometer according to claim 1 further comprising a passivation layer wherein the passivation layer covers the upper surface of the first semiconductor wafer and the upper surface of the second semiconductor wafer.

18. A microanemometer according to claim 17 wherein the passivation layer comprises nitride.

19. A microanemometer according to claim 1 wherein at least two opposing edges of the peripheral edge of the cavity are covered by the lower planar surface of the first semiconductor.

20. A microanemometer according to claim 1 wherein the first semiconductor comprises four corners and at least two of the four corners overlap with the peripheral edge of the cavity.

21. A microanemometer comprising:
   d) an electrically conductive resistor in the form of a semiconductor wafer doped with an impurity having
      1) an upper surface;
      2) a lower surface having a peripheral edge;
   e) a substrate bonded to the semiconductor wafer having
      1) an upper surface;
      2) a cavity having a peripheral edge and a peripheral margin defined on the upper surface and bounded by the peripheral edge of the cavity wherein the lower surface of the semiconductor wafer rests on and is supported by at least part of the peripheral edge of the cavity such that the semiconductor wafer is over the cavity; and
   f) a means for electrically connecting the resistor to a current source.

22. A microanemometer according to claim 21 wherein the substrate is a semiconductor wafer.

23. A microanemometer according to claim 21 which further comprises two metal lines connected to the upper surface of the semiconductor wafer.

24. A microanemometer according to claim 23 further comprising two pads wherein the two pads are connected respectively to the two metal lines.

25. A microanemometer according to claim 24 further comprising at least one through-wafer hole at least one pad is backed by a through-wafer hole filled with electroplated metal.

26. A microanemometer according to claim 25 wherein the electroplated metal filling the through-wafer holes protrude from their respective through-wafer holes at least 20 microns.

* * * * *

UNITED STATES PATENT AND TRADEMARK OFFICE
CERTIFICATE OF CORRECTION

PATENT NO. : 6,032,527  
APPLICATION NO. : 09/108894  
DATED : March 7, 2000  
INVENTOR(S) : Genova et al.

Page 1 of 1

It is certified that error appears in the above-identified patent and that said Letters Patent is hereby corrected as shown below:

At Column 10, line 11, change "d)" to --a)--

At Column 10, line 15, change "e)" to --b)--; and

At Column 10, line 24, change "f)" to --c)--.

Signed and Sealed this

Fifth Day of February, 2008

JON W. DUDAS  
*Director of the United States Patent and Trademark Office*